(12) United States Patent
Cojocaru et al.

(10) Patent No.: US 11,136,671 B2
(45) Date of Patent: Oct. 5, 2021

(54) MULTILAYER COMPOSITION AND PROCESS OF MAKING

(71) Applicant: SOLVAY SPECIALTY POLYMERS ITALY S.P.A., Bollate (IT)

(72) Inventors: Paula Cojocaru, Legnano (IT); Andrea Vittorio Oriani, Bresso (IT); Stefano Mauri, Giussano (IT); Marco Apostolo, Senago (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 49 days.

(21) Appl. No.: 15/778,988

(22) PCT Filed: Nov. 25, 2016

(86) PCT No.: PCT/EP2016/078844
§ 371 (c)(1),
(2) Date: May 24, 2018

(87) PCT Pub. No.: WO2017/089560
PCT Pub. Date: Jun. 1, 2017

(65) Prior Publication Data
US 2018/0355486 A1    Dec. 13, 2018

(30) Foreign Application Priority Data

Nov. 27, 2015    (EP) .................................... 15196643

(51) Int. Cl.
| | |
|---|---|
| C23C 18/20 | (2006.01) |
| C23C 18/22 | (2006.01) |
| C23C 18/30 | (2006.01) |
| H04R 31/00 | (2006.01) |
| H04R 7/12 | (2006.01) |
| C23C 18/40 | (2006.01) |
| C08G 65/40 | (2006.01) |
| C08L 81/06 | (2006.01) |
| C23C 18/44 | (2006.01) |
| C23C 18/16 | (2006.01) |

(52) U.S. Cl.
CPC ...... *C23C 18/2006* (2013.01); *C08G 65/4012* (2013.01); *C08L 81/06* (2013.01); *C23C 18/22* (2013.01); *C23C 18/30* (2013.01); *C23C 18/40* (2013.01); *C23C 18/44* (2013.01); *H04R 7/122* (2013.01); *H04R 31/003* (2013.01); *C08G 2650/40* (2013.01); *C23C 18/1653* (2013.01); *H04R 2307/025* (2013.01); *H04R 2307/027* (2013.01)

(58) Field of Classification Search
CPC . B32B 15/043; B32B 27/288; B32B 2371/00; B32B 27/06; B32B 27/08; B32B 27/286
See application file for complete search history.

(56) References Cited

U.S. PATENT DOCUMENTS

| | | | |
|---|---|---|---|
| 4,176,222 A | 11/1979 | Cinderey et al. | |
| 6,566,484 B2 | 5/2003 | Gharda et al. | |
| 2003/0130476 A1 | 7/2003 | Kemmish et al. | |
| 2009/0017319 A1 | 1/2009 | Fares-Karam | |
| 2012/0325576 A1* | 12/2012 | Taniguchi ............ | H04R 31/003 181/167 |
| 2014/0017508 A1 | 1/2014 | Lee et al. | |
| 2016/0008852 A1 | 1/2016 | Miyoshi | |

FOREIGN PATENT DOCUMENTS

| | | |
|---|---|---|
| CA | 847963 A | 7/1970 |
| JP | 2015109627 A | 6/2015 |
| WO | 2015/032915 A1 | 3/2015 |
| WO | 2015097206 A1 | 7/2015 |

OTHER PUBLICATIONS

Research Document 543027 A (Jul. 10, 2009).*

* cited by examiner

*Primary Examiner* — Ana L. Woodward
(74) *Attorney, Agent, or Firm* — Osha Bergman Watanabe & Burton LLP

(57) ABSTRACT

The present invention relates to a composition in the form of sheet or layer comprising a layer of an aromatic polymer and a layer of metal adhering to at least one side of said polymeric sheet, and to its uses.

7 Claims, 2 Drawing Sheets

MULTILAYER COMPOSITION AND PROCESS OF MAKING

CROSS-REFERENCE TO RELATED APPLICATIONS

This application is a U.S. national stage entry under 35 U.S.C. § 371 of International Application No. PCT/EP2016/078844 filed Nov. 25, 2016, which claims priority to European application No. 15196643.9, filed on Nov. 27, 2015. The entire contents of these applications are explicitly incorporated herein by this reference.

TECHNICAL FIELD

The present invention relates to a composition in the form of sheet or layer comprising a layer of an aromatic polymer and a layer of metal adhering to at least one side of said polymeric sheet, and to its uses.

BACKGROUND ART

The term "loudspeaker" (hereafter "speaker") may refer to individual transducers (known as "drivers") or to complete speaker systems consisting of an enclosure including one or more drivers.

The most common type of driver, commonly called a dynamic loudspeaker (FIG. 1), uses a lightweight diaphragm, or cone, that is a transducer intended to interconvert mechanical vibrations to sounds (and vice-versa), and is generally constructed of a thin membrane or sheet of various materials, suspended at its edges. Although paper, paper composites and laminates are the most commonly used materials for the construction of diaphragms, other materials have been used, including polypropylene (PP), polycarbonate (PC), Mylar (PET), silk, glass fibre, carbon fibre, titanium, aluminium, aluminium-magnesium alloy, nickel, and beryllium.

The diaphragm is connected to a rigid basket, or frame, via a flexible suspension, commonly called a spider, that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier. Thus, the material of the diaphragm must be highly flexible, strong enough to resist very rapid accelerations at a large variety of frequencies and durable.

The basic structure as described above is also used for microphones and earphones design.

One of the major issues in the area of loudspeakers is that the temperature of the diaphragm increases significantly during use, mainly due to friction and heat being transferred to the surface from the voice coil. This issue is particularly relevant for the so-called "micro" loudspeakers, wherein the widest dimension of the cone, i.e. the diameter in the case of circular speakers, is 30 mm or less, typically 20 mm or less.

An increase in the temperature of the loudspeaker membrane, besides resulting in lower sound quality due to sound distortion, reduces the service life of the speaker, as overheating makes the diaphragms prone to ruptures.

The need is particularly felt in the loudspeakers and microphone industry, especially in the area of micro devices, for a material suitable for producing durable diaphragms that are capable of high sound performance for prolonger time.

SUMMARY OF INVENTION

It has been now surprisingly found that the composition of the present invention can provide for outstanding flexibility properties, while ensuring superior dispersion of the heat and resistance to mechanical strains, also at high frequencies.

In addition, the composition of the invention has high barrier properties from the external environment, which improves the overall durability of the apparatus, such as a loudspeaker, a microphone, an earphone or a similar electronic device, wherein it is mounted.

In an aspect, the present invention relates to a composition (C) in the form of a sheet or film, comprising at least a layer (a) comprising an aromatic polymer (polymer P) and a layer (b) of a metal compound (M1) coated on at least one side of layer (a), wherein the thickness of the layer (a) is from 1 to 10 micrometers and the thickness of layer (b) is 100 to 1500 nanometers.

In another aspect, the present invention relates to a process for the preparation of a composition (C) as defined above, comprising the steps of:
i. providing at least one sheet comprising a layer [layer (L1)] consisting of a composition [composition (C1)] comprising, preferably consisting of, at least one aromatic polymer [polymer (P)], said layer (L1) having two opposite surfaces;
ii. treating at least one surface (S1) of the layer (L1) with a radio-frequency glow discharge process in the presence of an etching gas medium;
iii. applying by electroless deposition a layer [layer (L2)] onto the at least one treated surface (S1) provided in step ii., said layer (L2) comprising at least one metal compound [compound (M1)];
iv. optionally, repeating the treatment of steps ii. and iii. on the untreated side of (L1).

In another aspect, the present invention provides an electric or electronic device comprising a composition (C) as defined above.

DESCRIPTION OF EMBODIMENTS

Figure 1:
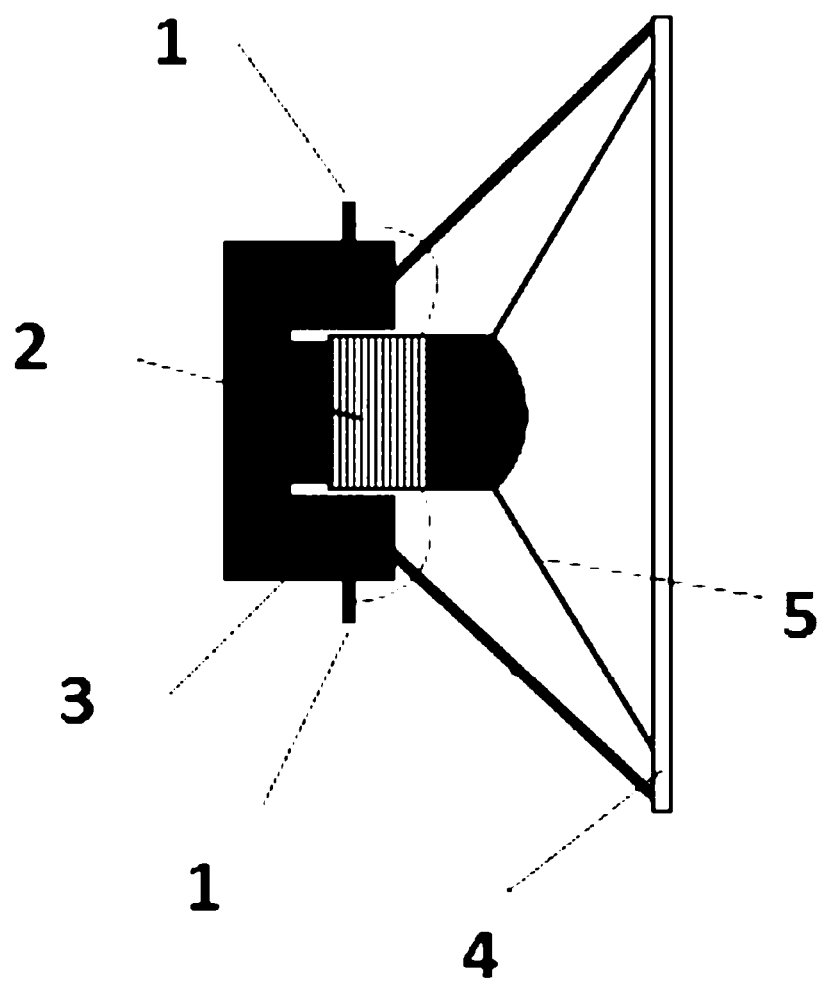
FIG. 1 represents a schematic depiction of a loudspeaker structure, comprising a signal input (1), a voice coil (2), a magnet (3), a frame (4) and a diaphragm (or cone) (5).

Unless otherwise specified, in the context of the present invention the amount of a component in a composition is indicated as the ratio between the weight of the component and the total weight of the composition multiplied by 100 (also: "wt %").

The inventors found that using a metallized diaphragm, i.e. a thin layer of polymeric material comprising an aromatic polymer (polymer P) at least partially coated with a layer (b) of a metal compound (M1) (composition (C)), reduces localized heating of the diaphragm at the area of contact with the voice-coil, resulting in overall increase in heat dissipation capability. Thus, transducers (such as loudspeakers, microphones and earphones) wherein the diaphragm comprises the composition of the invention have better sound quality and longer service life with respect to the commonly used devices.

In a preferred embodiment, in composition layer (a) comprises, or consists of, a polymer (P) selected from a polyaryletherketone (PAEK, P1), a polysulfone (P2), or mixtures thereof.

In the context of the present invention, the term "PAEK" indicates any polymer of which more than 50 wt % of the recurring units are recurring units (R1) of one or more of the following formulae:

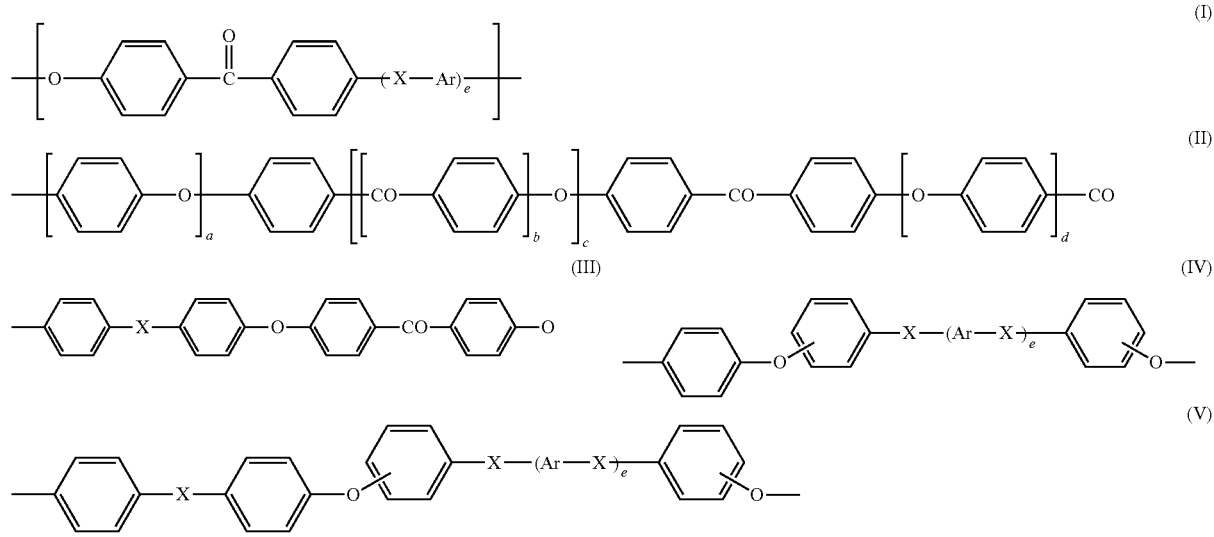
wherein:
Ar is independently a divalent aromatic radical selected from phenylene, biphenylene or naphthylene,
X is independently O, C(=O) or a direct bond,
n is an integer of from 0 to 3,
b, c, d and e are 0 or 1,
a is an integer of 1 to 4, and
preferably, d is 0 when b is 1.
The recurring units (R1) may notably be chosen from
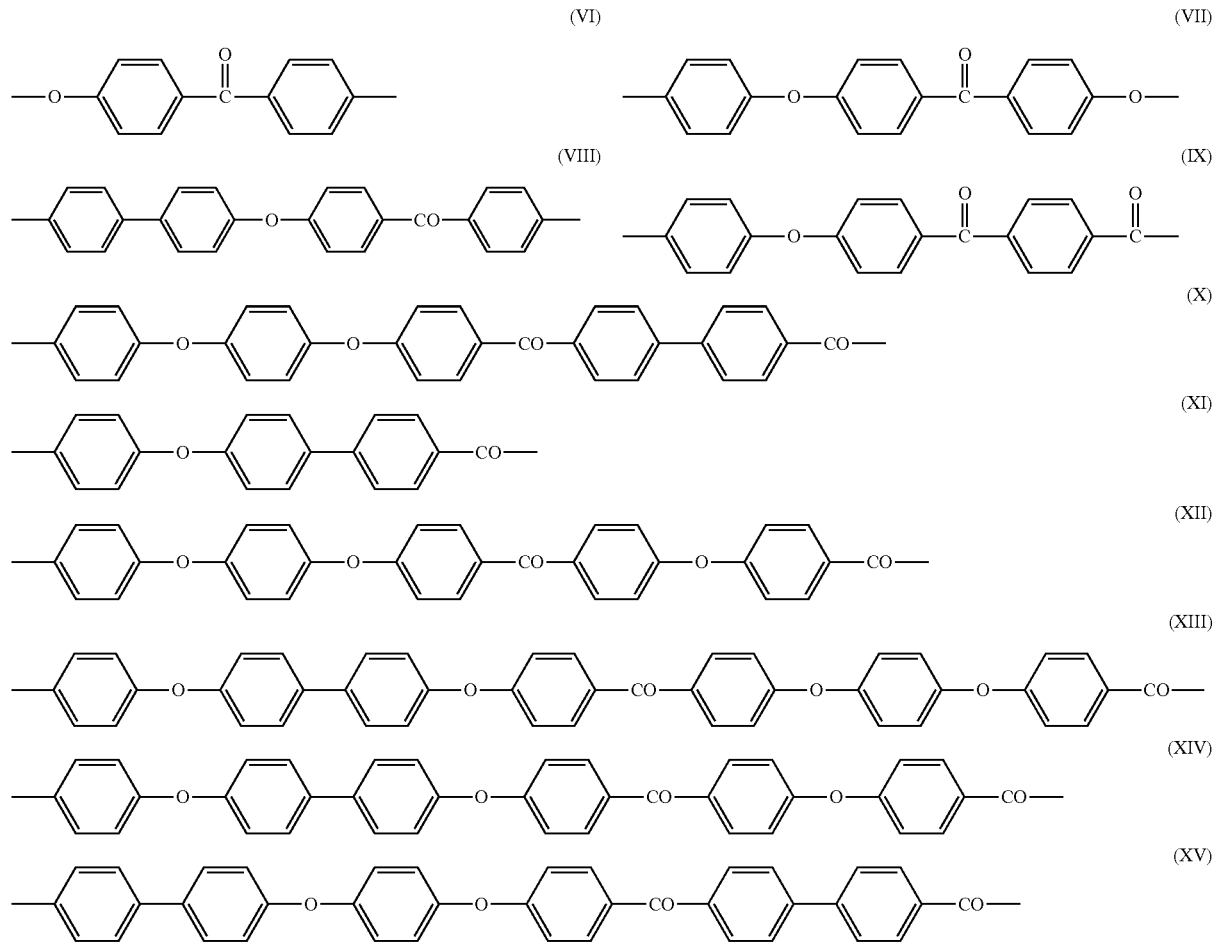

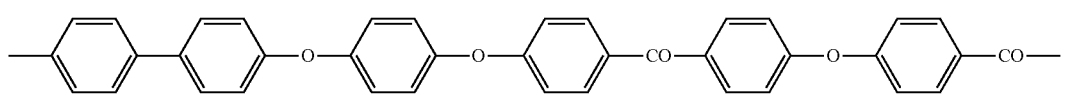 (XVI)

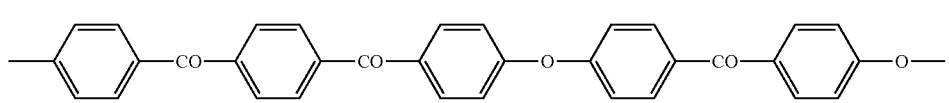 (XVII)

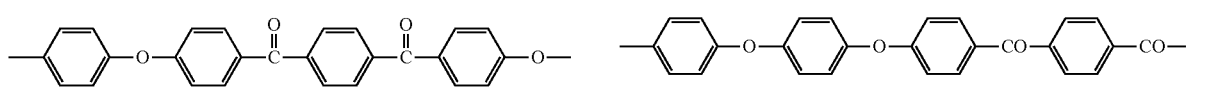 (XVIII)

(XIX)

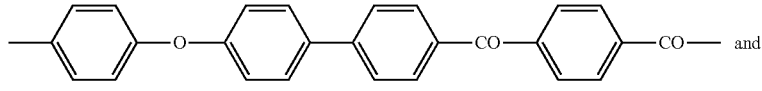

(XX)

and (XXI)

Preferably, the recurring units (R1) are chosen from:

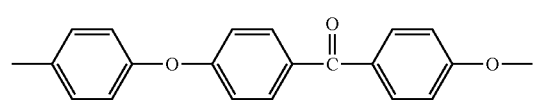

(VII)
and
(IX)

More preferably, the recurring units (R1) are:

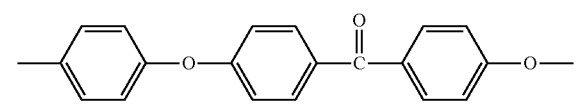

(VII)

For the purpose of the present invention, a polyetheretherketone is intended to denote any polymer wherein more than 50 wt % of the recurring units are recurring units (R1) of formula (VII).

Preferably more than 70 wt %, and more preferably more than 85 wt % of the recurring units of the poly(aryl ether ketone) (P1) are recurring units (R1). Still more preferably, essentially all the recurring units of the poly(aryl ether ketone) (P1) are recurring units (R1). The most preferably, all the recurring units of the poly(aryl ether ketone) (P1) are recurring units (R1).

Excellent results are obtained when the poly(aryl ether ketone) (P1) is a polyetheretherketone homopolymer, i.e. a polymer of which essentially all, if not all, the recurring units are of formula (VII).

The poly(aryl ether ketone) (P1) has advantageously a reduced viscosity (RV) of at least 0.60 dl/g, as measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution, to limit sulfonation. The RV of the poly(aryl ether ketone) (P1) is preferably of at least 0.65 dl/g, more preferably of 0.70 dl/g. Besides, the RV of the poly(aryl ether ketone) (P1) is advantageously of at most 1.20 dl/g, preferably at most 1.10 and still more preferably at most 1.00 dl/g.

The poly(aryl ketone) (P1) can be prepared by any method known ti the person skilled in the art.

One method well-known in the art comprises reacting a substantially equimolar mixture of at least one bisphenol and at least one dihalobenzoid compound or at least one halophenol compound, e.g. as described in Canadian Pat. No. 847,963. Non limitative example of bisphenols useful in such a process are hydroquinone, 4,4'-dihydroxybiphenyl and 4,4'-dihydroxybenzophenone; non limitative examples of dihalobenzoid compounds useful in such a process are 4,4'-difluorobenzophenone, 4,4'-dichlorobenzophenone and 4-chloro-4'-fluorobenzophenone; non limitative examples of halophenols compounds useful in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222, the whole content of which is herein incorporated by reference.

Another method well-known in the art to produce PEEK homopolymers comprises electrophilically polymerizing phenoxyphenoxybenzoic acid, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

The polymer composition (C) can consist of only one poly(aryl ether ketone) (P1). Alternatively, it can comprise two, three, or even more than three poly(aryl ether ketone)s (P1). Certain preferred mixes of poly(aryl ether ketone)s (P1) are:

mixtures consisting of (i) at least one poly(aryl ether ketone) (P1a) of which more than 50 wt % of the recurring units, preferably essentially all the recurring units, and still more preferably all the recurring units are of formula

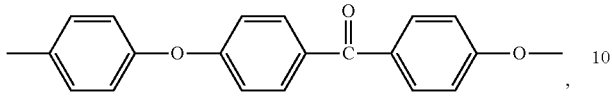
(VII)

with (ii) at least one poly(aryl ether ketone) (P1b) of which more than 50 wt % of the recurring units, preferably essentially all the recurring units, and still more preferably all the recurring units are of formula

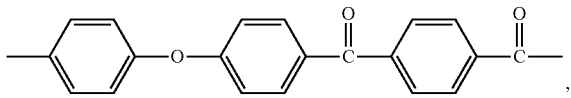
(IX)

and, optionally in addition, with (iii) at least one other poly(aryl ether ketone) (P1c) different from poly(aryl ether ketone)s (P1a) and (P1b); in particular, mixes consisting of (i) at least one poly(aryl ether ketone) (P1a) of which essentially all, if not all, the recurring units are of formula (VII) with (ii) at least one poly(aryl ether ketone) (P1b) of which essentially all, if not all, the recurring units are of formula (IX);

still more particularly, binary mixes consisting of (i) one poly(aryl ether ketone) (P1a) of which all the recurring units are of formula (VII) with (ii) one poly(aryl ether ketone) (P1b) of which all the recurring units are of formula (IX).

In a preferred embodiment, polymer (P) consists of, or comprises, a polysulfone (polymer (P2).

Particularly good results in terms of heat dissipation are obtained when (P) is a poly(aryl ether)sulfone (P2a), a polysulfone (P2b), a poly(biphenyl ether sulfone) (P2c) or mixtures thereof.

In the context of the present invention, the term "polysulfone" has been used generically to describe any polymer containing repeating or recurring units of one or more diaryl sulfone groups (e.g., monomers) of general formula —(Ar—SO$_2$—Ar)—, where Ar is a substituted or unsubstituted aryl group such as a phenyl, biphenyl, bisphenol or any other aryl group containing an aromatic hydrocarbon or hetero-aromatic ring.

Such polymers include repeating or recurring units of a diaryl sulfone such as diphenyl sulfone (e.g. —C$_6$H$_4$—SO$_2$—(C$_6$H$_4$)—) bonded to a diphenol such as biphenol (e.g., HO—(C$_6$H$_4$)—(C$_6$H$_4$)—OH).

A single diphenyl sulfone group is shown below (formula (I)):

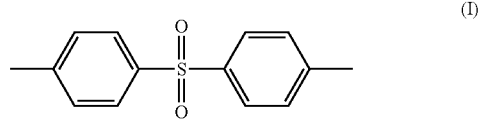
(I)

For the purposes of the present description:

the term poly(aryl ether)sulfone (PES or PESU) (P2a) indicates a polymer wherein more than 50% of the recurring units, preferably at least 90%, more preferably at least 95%, consist of units having the following formula (R1):

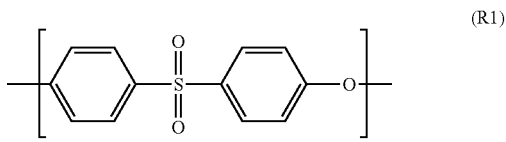
(R1)

the term polysulfone (PSU or PFS) (P2b) indicates a polymer wherein more than 50 wt % of the recurring units (R2) are recurring units containing at least one ether group (—O—), at least one sulfone group (—SO$_2$—) and at least two arylene groups linked to each other via a secondary, ternary or quaternary carbon atom.

For the sake of clarity, a secondary carbon atom denotes a carbon atom bonded to two other carbon atoms with single bonds and to two hydrogen atoms, a ternary carbon atom denotes a carbon atom bonded to three other carbon atoms with single bonds and to one hydrogen atom, and a quaternary carbon atom denotes a carbon atom bonded to four other carbon atoms with single bonds.

The two arylene groups linked to each other via a secondary, ternary or quaternary carbon atom are preferably linked to each other via a ternary or quaternary carbon atom, more preferably, they are linked to each other via a quaternary atom.

In the recurring units (R2), the secondary, ternary or quaternary carbon atom link advantageously the two arylene groups to each other as schemed below:

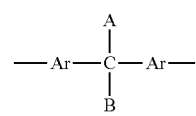

where A and B may be the same or different. A and B can notably be, independently from each other selected from the group consisting of hydrogen, hydroxyl, hydroxyalkyls, hydroxyaralkyls, alkoxys, aralkyloxys, amino, aminoalkyls, aminoaralkyls, alkyls (such as methyl, ethyl, butyls), aralkyls (such as benzyl), halogens (in particular, fluorine), halogenated alkyl groups (in particular, trifluoromethyl), halogenoaralkyls, and alkyl and aralkyl groups substituted by carboxylic acid functions, ester functions, amido functions, aldehyde groups and/or ketone groups, and mixtures thereof.

A and B are preferably identical. Besides, A and B are preferably alkyl groups.

More preferably, A and B are both a methyl group.

The recurring units (R2) are preferably selected from the group consisting of:

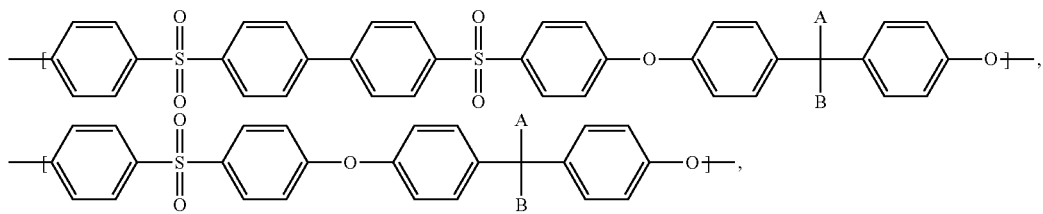

and mixtures thereof.

More preferably, the recurring units (R2) are of the general structural formula:

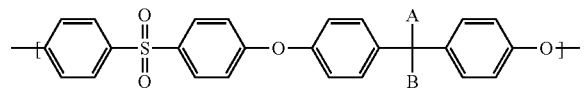

Still more preferably, the recurring units (R2) are of the formula:

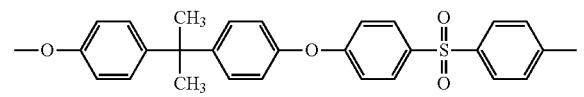

Optionally, the polysulfone (M2) further comprises recurring units (R2*) other than recurring units (R2).

Recurring units (R2*) may be selected from the group consisting of:

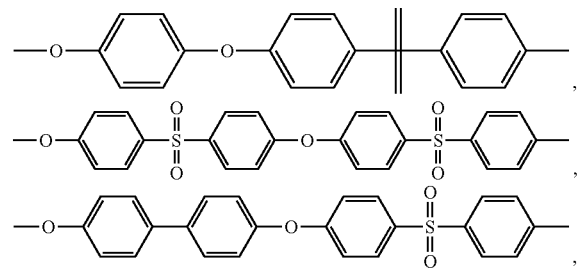

and mixtures thereof.

Preferably more than 70 wt % and more preferably more than 90 wt % of the recurring units of the poly sulfone) (P2b) are recurring units (R2). Still more preferably, the poly sulfone (P2b) is a homopolymer of recurring units (R2), essentially all the recurring units (or even, all the recurring units) are recurring units (R2).

Good results were obtained when (P2b) is an homopolymer of the recurring units (R2) which were of the formula:

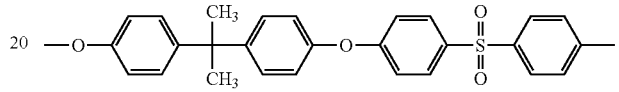

For the purpose of the invention, a poly(biphenyl ether sulfone) (P2c) (also indicated as PPSU) is intended to denote a polycondensation polymer of which more than 50 wt % of the recurring units are recurring units (R3) contain at least one ether group (—O—), at least one sulfone group (—SO$_2$—) and at least one p-biphenylene group:

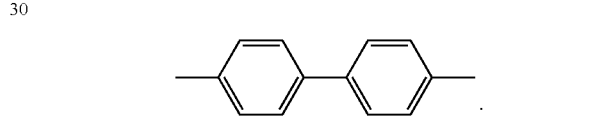

Preferably, recurring units (R3) comply with the general structural formula:

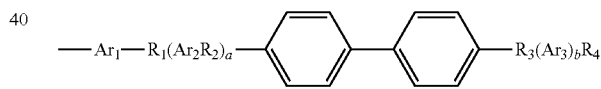

wherein $R_1$ through $R_4$ are —O—, —SO$_2$—, —S—, —CO—, with the proviso that at least one of $R_1$ through $R_4$ is —SO$_2$— and at least one of R1 through R4 is —O—; Ar$_1$, Ar$_2$ and Ar$_3$ are arylene groups containing 6 to 24 carbon atoms, and are preferably phenylene or p-biphenylene; and a and b are either 0 or 1.

More preferably, recurring units (R3) are selected from the group consisting of:

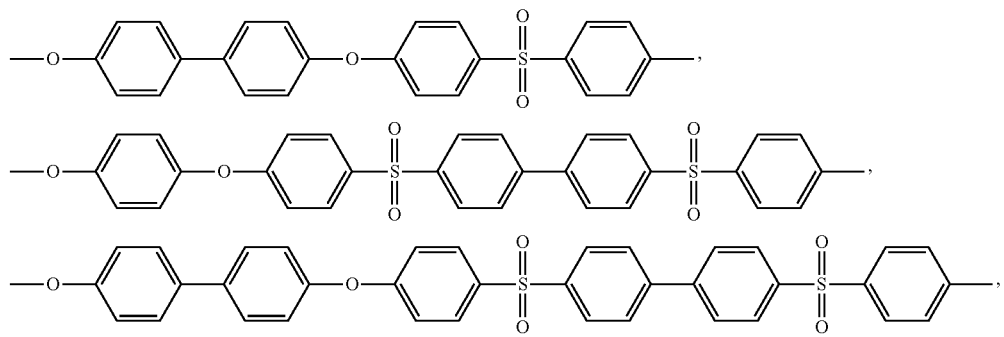

-continued

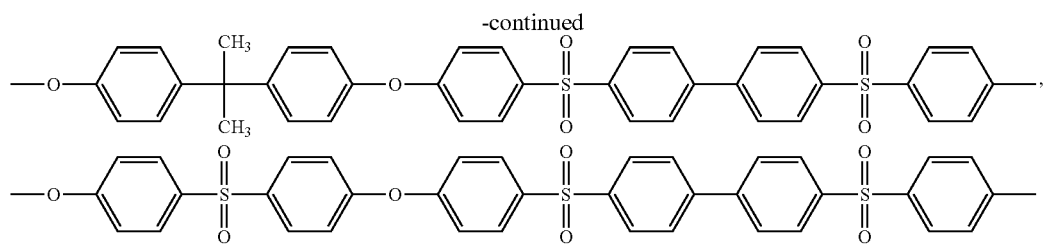

and mixtures thereof.

Still more preferably, recurring units (R3) are

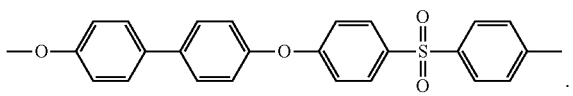

Optionally, the poly(biphenyl ether sulfone) (P2c) further comprises recurring units (R3*) other than recurring units (R3).

Recurring units (R3*) may be selected from the group consisting of:

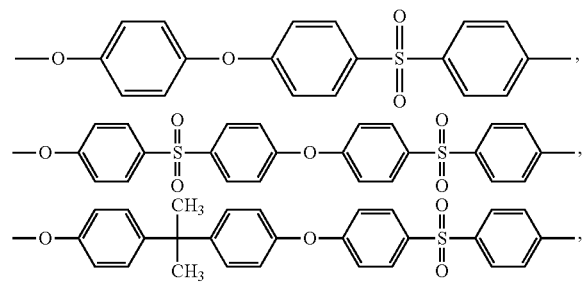

and mixtures thereof.

The poly(biphenyl ether sulfone) (M3) may notably be a homopolymer, a random, alternating or block copolymer.

Preferably more than 70 wt % and more preferably more than 90 wt % of the recurring units of the poly(biphenyl ether sulfone) (M3) are recurring units (R3). Still more preferably, essentially all the recurring units (or even, all the recurring units) are recurring units (R3)

Outstanding results in terms of the above-mentioned non-stick and mechanical properties for the article of the invention are obtained when (P1) is an homopolymer, the recurring units (R3) of which are of formula:

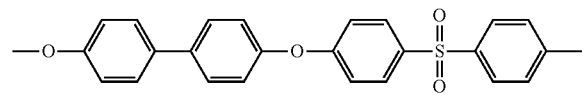

Preferably, in the composition (C) according to the invention, the thickness of layer (a) is in the range from 3 to 8 micrometers, preferably from 4 to 6 micrometers, and/or the thickness of layer (b) is from 100 to 1500 nanometers.

Preferably, in the composition (C) according to the invention the metal compound (M1) is selected from the group consisting of:

i. Cu, Al, Ni, Pd, Ag, Au, Co and alloys thereof, and ii. non-doped metal oxides selected from the group consisting of: SiOx, ZnO, $In_2O_3$, $SnO_2$ and mixtures thereof, wherein x is comprised between 0.5 and 2, iii. Sn- or Al-doped metal oxides selected from the group consisting of ZnO, $In_2O_3$, $SnO_2$, CdO, and mixtures thereof, and iv. $Zn_2SnO_4$, $ZnSnO_3$, $Zn_2In_2O_5$, $Zn_3In_2O_6$, $In_2SnO_4$, $CdSnO_3$ and mixtures thereof.

In an aspect, the present invention provides a method for the manufacturing of composition (C) as defined above, said method comprising the steps of:

i. providing at least one sheet comprising a layer [layer (L1)] consisting of a composition [composition (C1)] comprising, preferably consisting of, at least one aromatic polymer [polymer (P)], said layer (L1) having two opposite surfaces;

ii. treating at least one surface (S1) of the layer (L1) with a radio-frequency glow discharge process in the presence of an etching gas medium;

iii. applying by electroless deposition a layer [layer (L2)] onto the at least one treated surface (S1) provided in step ii., said layer (L2) comprising at least one metal compound [compound (M1)];

iv. optionally, repeating the treatment of steps ii. and iii. on the untreated side of (L1).

By "electroless deposition" it is meant a redox process typically carried out in a plating bath between a metal cation and a proper chemical reducing agent suitable for reducing said metal cation in its elemental state.

Preferably, in the method according to the present invention, in step (ii) the etching gas medium is selected from the group consisting of air, $N_2$, $NH_3$, $CH_4$, $CO_2$, He, $O_2$, $H_2$ and mixtures thereof.

More preferably, said nitrogen-containing gas is a mixture of $N_2$ and $H_2$ (i.e. forming gas) with He.

The gas rate can be selected according to the procedure known by the skilled person. Good results have been obtained by using gas flow between 5 nl/min and 15 nl/min, preferably of about 10 nl/min.

Preferably, in step ii., the radio-frequency glow discharge process is carried out at a radio-frequency comprised between 1 kHz and 100 kHz, and/or at a voltage comprised between 1 kV and 50 kV.

Preferably, under step iii. of the process of the present invention, said composition (C1) is in a solution or a colloidal suspension of the metallization catalyst in a suitable solvent, such as water.

Preferably, step iii. is performed by dipping the activated layer (L1) as obtained in step iii. in a composition (C2) comprising the metal compound (M1).

Preferably, said compound (M1) comprises one or more metal salts. More preferably, said compound (M1) preferably comprises one or more metal salts of the metals listed above.

Should the disclosure of any patents, patent applications, and publications which are incorporated herein by reference conflict with the description of the present application to the extent that it may render a term unclear, the present description shall take precedence.

The present invention will be hereunder described in more detail with reference to the following examples, whose purpose is merely illustrative and not limitative of the scope of the invention.

EXAMPLES

Materials

KetaSpire® PEEK, KT 820 film, 6 μm thick, supplied by Ajedium Films.

Commercial copper electroless solution, Printoganth® PV, supplied by Atotech.

Commercial copper electrodeposition solution, Bagno Rame Acido, supplied by Tecnochimica®

Example 1a—Manufacture of a Multi-Layered Article

Some of the 6 μm thick KT 820 film was treated as follows.

Step (a)

An atmospheric plasma treatment was performed on one surface of the film by means of a Dielectric Barrier Discharge (DBD) device with mobile upper electrode, in the following conditions:
electrode distance 1 mm
gas flow 10 nl/min
gas composition 95% $N_2$+5% $H_2$
source power 400 W
mobile electrode speed 2 m/min The treatment resulted in an equivalent corona dose of about 2900 W min/m$^2$.

The film thus obtained will be hereinafter referred to as "Film AP".

Step (b)

Film AP obtained according to the procedure disclosed in step (a) was subjected to electroless deposition in order to obtain a layer of metallic copper.

The plaque was cleaned by dipping in a suitable solution containing isopropyl alcohol and, then, contacted with a $PdCl_2$ solution.

The palladium ions were reduced to metallic palladium. Then, electroless deposition of copper was performed by dipping the sample in the bath containing the Atotech's Printogant PV solution, for 180 seconds, at 45° C., so that the metallic copper was deposited on the surface of the film (layer thickness 250 nm). The film thus obtained will be hereinafter referred to as "Film EC".

Example 1b—Manufacture of a Multi-Layered Article with Increased Metal Thickness Some of the Film EC was treated as follows.

Electrodeposition with Bagno Rame Acido™, supplied by Tecnochimica®, was performed in order to obtain two different metal thicknesses on Film EC. After immersing the sample in the solution containing copper ions, deposition was performed in the following conditions using a galvanostat Room temperature
Soluble Copper counter electrode
Current density 15 mA/cm$^2$ Two different electrodeposition times were adopted on different portions of Film EC, namely for one sample the current was circulated in the system for 120 seconds—this will be hereinafter referred to as "Film ECD 1" (total metallic layer thickness 750 nm)—, for the second sample current was circulated in the system for 240 seconds, this will be thereinafter referred to as "Film ECD 2" (total metallic layer thickness 1100 nm).

Comparative Example 1

A 6 μm thick KetaSpire® PEEK, KT 820 film, supplied by Ajedium® Films is considered without surface modification. This will be thereinafter referred to as "Film B".

Example 2—Thermal Characterization

Figure 2:
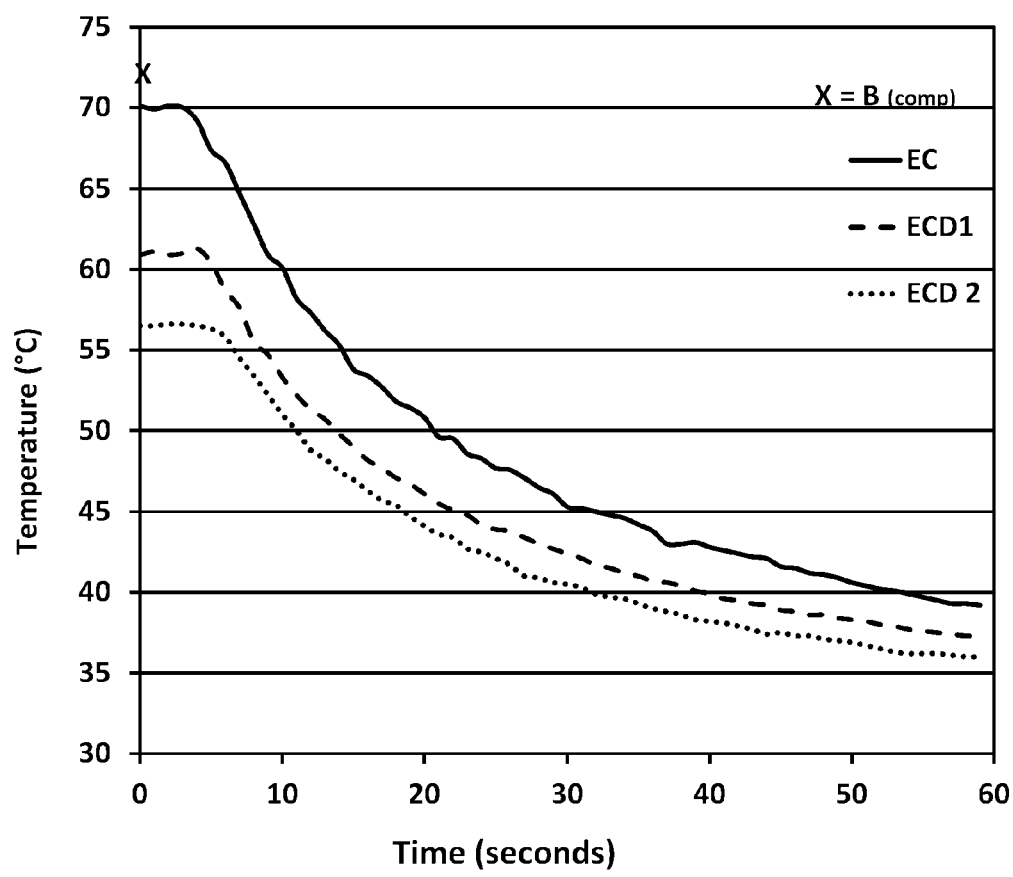
FIG. 2—temperature profiles for the three samples having different metal thickness values

The polymer-metal multilayers prepared according to example 1a and 1b were characterized by an infrared camera to determine their thermal properties. The experimental setup involved the use of a circular voice-coil, outer diameter 10 mm, in which a continuous current of 130 mA was circulated by means of a galvanostat. The voice-coil was positioned in contact with the multilayer having the toroidal surface parallel to the multilayer itself. The voice-coil was heated due to joule effect and a thermal camera was used to measure the temperature field on the multilayer assembly on the opposite side with respect to the heat source. For all samples the polymeric part of the multilayer was exposed to the camera and the metallic surface was in contact with the voice-coil. FIG. 2 reports the maximum temperature profile recorded on the surface of the assembly, for three metal thickness values, once current circulation in the voice-coil is interrupted. In all the three cases, current circulation was interrupted once the surface temperature on the sample was stable. Table 1 reports the maximum equilibrium temperature for the three multilayers together with the one which is expected for the sample reported in Comparative example 1, in this case the temperature of the diaphragm is expected to be the same as the voice-coil at the contact point.

Table 1—Comparison of Equilibrium Temperature for the Multilayers Compared to the Non-Coated Polymer (B)

TABLE 1

| | Sample | | | |
|---|---|---|---|---|
| | Film B (comparative) | Film EC | Film ECD 1 | Film ECD 2 |
| Maximum equilibrium temperature (° C.) | 73 | 70.1 | 60.9 | 56.5 |

For all the examples according to the invention, the temperature was significantly lower than that of the comparative composition.

The invention claimed is:

1. An electric or electronic device that is a loudspeaker or a microphone having a diaphragm, wherein the diaphragm is formed at least partially of a composition (C) in the form of a sheet or film, comprising at least a layer (a) comprising an aromatic polymer (polymer P) and a layer (b) of a metal compound (M1) coated on at least one side of layer (a), wherein the thickness of the layer (a) is from 1 to 10 micrometers and the thickness of layer (b) is 100 to 1500 nanometers, wherein said polymer (P) consists of a polyaryletherketone (PAEK, polymer P1).

2. The electric or electronic device according to claim 1, wherein the polyaryletherketone comprises at least a polyether ether ketone.

3. The electric or electronic device comprising a composition (C) according to claim 2, wherein the polyaryletherketone consists of a polyether ether ketone.

4. The electric or electronic device according to claim 1, wherein the thickness of layer (a) is in the range from 3 to 8 micrometers and/or the thickness of layer (b) is from 250 to 1500 nanometers.

5. The electric or electronic device comprising a composition (C) according to claim 4, wherein the thickness of layer (a) is in the range from 4 to 6 micrometers and the thickness of layer (b) is from 250 to 1500 nanometers.

6. The electric or electronic device according to claim 1, wherein the metal compound (M1) is selected from the group consisting of:
   i. Cu, Al, Ni, Pd, Ag, Au, Co and alloys thereof,
   ii. non-doped metal oxides selected from the group consisting of: $SiO_x$, ZnO, $In_2O_3$, $SnO_2$ and mixtures thereof, wherein x is comprised between 0.5 and 2,
   iii. Sn- or Al-doped metal oxides selected from the group consisting of ZnO, $In_2O_3$, $SnO_2$, CdO, and mixtures thereof, and
   iv. $Zn_2SnO_4$, $ZnSnO_3$, $Zn_2In_2O_5$, $Zn_3In_2O_6$, $In_2SnO_4$, $CdSnO_3$ and mixtures thereof.

7. The electric or electronic device comprising a composition (C) according to claim 1, wherein layer (a) consists of the polymer (P).

* * * * *